May 12, 1964 R. F. KUHN, JR 3,132,479
UNIVERSAL RESTRAINER AND JOINT
Filed Feb. 29, 1960 4 Sheets-Sheet 1

INVENTOR.
RALPH F. KUHN JR.
BY
*Lowell G. Turner*
AGENT

May 12, 1964 R. F. KUHN, JR 3,132,479
UNIVERSAL RESTRAINER AND JOINT
Filed Feb. 29, 1960 4 Sheets-Sheet 2

INVENTOR.
RALPH F. KUHN JR.

BY

AGENT

May 12, 1964 R. F. KUHN, JR 3,132,479
UNIVERSAL RESTRAINER AND JOINT
Filed Feb. 29, 1960 4 Sheets-Sheet 3

INVENTOR.
RALPH F. KUHN JR.
BY
AGENT

May 12, 1964 R. F. KUHN, JR 3,132,479
UNIVERSAL RESTRAINER AND JOINT
Filed Feb. 29, 1960 4 Sheets—Sheet 4

INVENTOR.
RALPH F. KUHN JR.
BY
AGENT

United States Patent Office 3,132,479
Patented May 12, 1964

3,132,479
UNIVERSAL RESTRAINER AND JOINT
James E. Webb, Administrator of the National Aeronautics and Space Administration, with respect to an invention of Ralph F. Kuhn, Jr.
Filed Feb. 29, 1960, Ser. No. 11,853
13 Claims. (Cl. 60—35.55)

This invention relates to means for universally restraining relatively movable and interconnected structural units, and more particularly to a mechanism for tying or restraining universal joints so as to prevent joint separation while allowing freedom of movement in bending, angulation, and lateral offset in any position about an original axis.

Flexible joints of the prior art, to achieve the capability of universal freedom of movement while being restrained against axial separation, have been required to include ties of a generally heavy and bulky nature, usually including gimbal rings and tension ties. When such joints are adapted to hardware flyable in aircraft or missiles the weight and size of these components achieve major significance and therefore receive grave consideration. Compactness of the overall systems to which these joints are applied is adversely affected, as is the total vehicle weight. General complexity of construction with a resultant tendency toward malfunction has also been an inherently detrimental aspect of prior art devices. Throughout industry, e.g. in oil fields and oil refineries, a need has also existed for a compact universal joint and tie means having simplicity of construction and versatility of application.

The present invention overcomes the mentioned detrimental characteristics and meets industry requirements by providing a simple restrainer having a swinging beam and mechanical tie configuration. Restrainers constructed in accordance with this invention have application not only to a variety of flexible lines, but may also be utilized as a gimbal for rocket engine thrust chambers.

The universal joint is generally comprised of a pair of pivotally mounted beams known as swinging beams positioned upon each end of a flexible line. Each pair of beams is pivoted about an axis common to those beams, the axes through the beams on opposite ends being mutually perpendicular. Each swinging beam has a mechanical tie movably connected to each of its ends, each tie extending essentially axially of the flexible line and into universal connection with an end of one of the swinging beam members on the opposite end of the flexible line. Thus, each pair of ties connected to a single swinging beam on one end of the joint is connected to one end of each swinging beam on the opposite end. It is this interconnection method which imparts to the present invention the ability of achieving all aspects of universal action. While the device is structurally simple, it is, nevertheless, rugged and adaptable to a large variety of applications. Initial cost and subsequent maintenance requirements are also minimized by the basic simplicity. Size and weight for particular applications are but a fraction of the size and weight of prior art devices having similar capabilities.

A major object of this invention is to provide means in combination with a flexible joint for restraining axial movement while otherwise facilitating universal movement.

Another object of this invention is to provide a flexible joint restraining unit having light weight and being capable of universal movement.

Yet another object is to provide restraining means capable of connecting opposite and mutually movable ends of a flexible structure.

A further object of this invention is to provide a structure which will allow a maximum of universal movement between opposite end pieces of a flexible line.

A still further object is to provide gimbal means for a power device such as a rocket engine.

Another object of this invention is to provide a universal joint tie of simple and rugged construction.

Other objects of this invention will become apparent upon examination of the appended drawings wherein.

Figure 1:
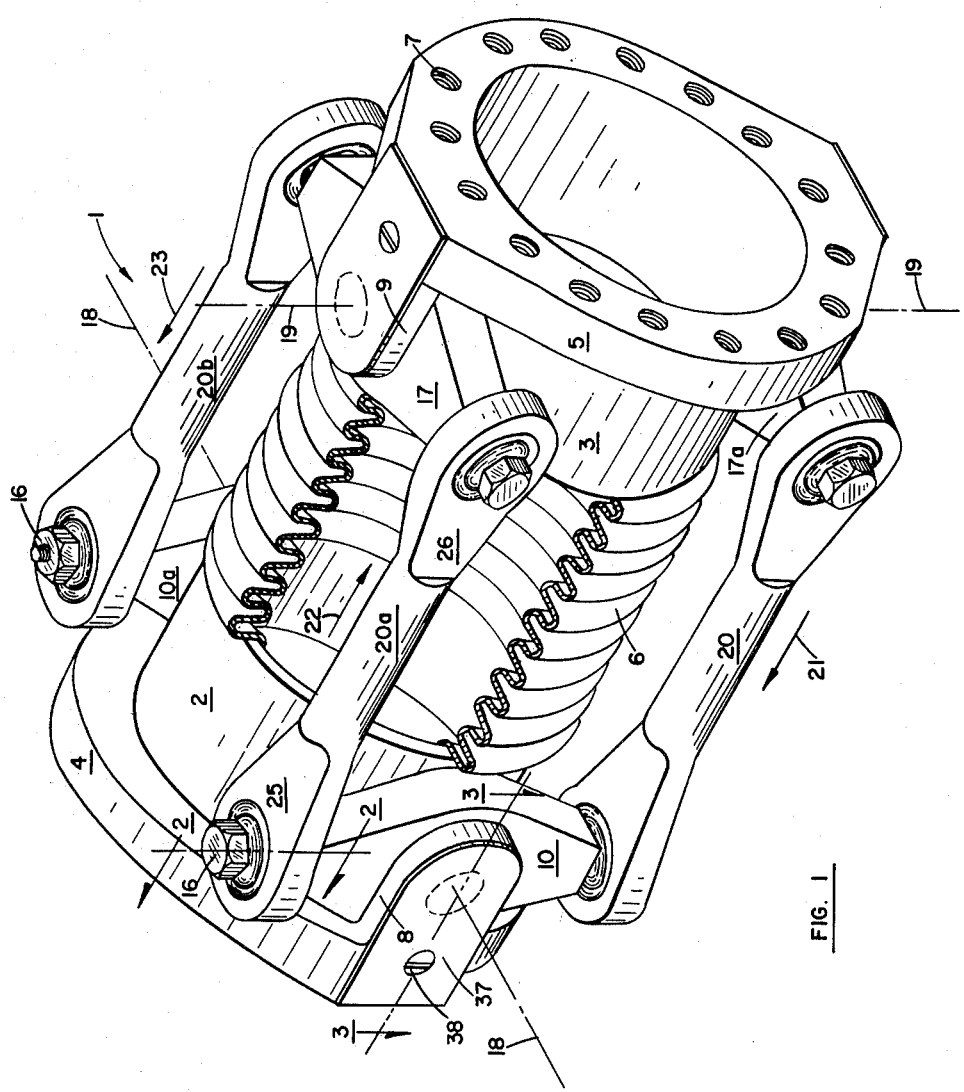
FIG. 1 is a partially cutaway perspective view of the tie means of the present invention in combination with a flexible bellows joint.

Referring to the drawings in detail, FIG. 1 illustrates the present invention in its preferred embodiment. Therein, a flexible joint is indicated as 1. It includes a pair of end members or end pieces 2 and 3 incorporating flanges 4 and 5 respectively, sealably attached to opposite ends of an intermediate bellows member 6. Threaded holes 7, or similar conventional attachment means, are provided in flanges 4 and 5 for attaching the joint intermediate a pair of pipes or other structural elements. Brackets 8 and 9 extend from flanges 4 and 5 respectively. A pair of swinging beam members 10 and 10a are pinned, bolted, or otherwise pivotally connected at a point intermediate their ends between end piece 2 and brackets 8. It is preferable that flanges 4 and 5 be faired evenly into brackets 8 and 9, essentially as illustrated, in order that structural loads transferred into the flanges from the swinging beams are disposed evenly about the flanges, rather than being localized in the region of the brackets.

Each of beams 10 and 10a includes upon each of its ends a pin or bolt having an enlarged portion 15 for adaptation through related structural members and a portion 15a of smaller diameter threaded for acceptance of a nut 16. This structure is most clearly illustrated in FIG. 2.

A second pair of swinging beam members 17 and 17a are constructed similar to beams 10 and 10a and are attached to end piece 3.

It is to be noted that beams 10 and 10a are mounted upon end piece 2 to pivot about a single axis, indicated as axial line 18. Beams 17 and 17a are mounted upon end piece 3 to pivot about an axis indicated as axial line 19. It is to be further noted that axes 18 and 19 are positioned at approximately right angles to one another. Therefore, beams 10 and 10a are free to swing in planes which are mutually perpendicular to the planes in which beams 17 and 17a swing.

Beams 10 and 10a are connected to beams 17 and 17a by a series of rigid tie rods 20, 20a, 20b, and 20c (hidden). Tie rod 20 has one of its ends universally connected to a first end of beam 10 and its other end universally connected to a first end of beam 17a. Tie rod 20a has one of its ends universally connected to a second end of beam 10 and its other end universally connected to a first end of beam 17. Similarly, tie rod 20b has one of its ends universally connected to a second end of beam 10a and its other end universally connected to a second end of beam 17. Tie rod 20c (not shown) has one of its ends universally connected to a first end of beam 10a and its opposite end universally connected to a second end of beam 17a. Thus, as viewed from the FIG. 1 position, were beam 10 to be pivoted clockwise about axis 18, tie rods 20 and 20a would be moved in the directions indicated by arrows 21 and 22. Simultaneously, beam 17 would be rotated in a counter-clockwise direction about axis 19 and beam 17a would be rotated in the clockwise direction. The rotation of beam 17 would transmit force to move tie rod 20b in the direction indicated by arrow 23 and tie rod 20c in the opposite direction, causing beam 10a to be rotated counter-clockwise.

Figure 2:
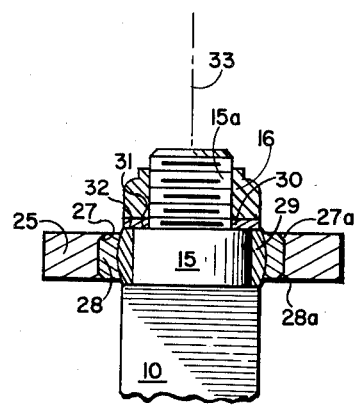
FIG. 2 is an enlarged partial section of a typical swinging beam and tie rod connection of this invention taken generally along lines 2—2 of FIG. 1.

Each FIG. 1 tie rod and its included structure is constructed in an identical manner. Therefore, the following description of tie 20a applies equally to each of the other tie rods. Tie rod 20a includes flattened end portions 25 and 26, the flat faces on opposite ends of which lie in planes mutually perpendicular to one another and the end tapers of which are oppositely directed. The end portions themselves are identically constructed. As shown in FIG. 2, end 25 includes a bore 27 into which is pressed, pinned, or otherwise adapted, a bearing retainer or race 28. Here, edges 27a about bore 27 are shown as being peened over chamfered corners 28a of retainer 28. Retainer 28 encloses a perforated segment of a ball 29 which is universally rotatable within retainer 28. The retainer and ball structure is commercially obtainable and may be constructed in accordance with U.S. Patent No. 2,626,841. Pin 15 of beam 10 is inserted through the perforation within ball 29, and a washer 30 is positioned between nut 16 and adjacent flushed surfaces 31 and 32 of pin 15 and ball 29 respectively to maintain their relative positions. When beam 10 is pivoted about axis 18, or when tie rod 20a is pivoted either clockwise or counter-clockwise about axis 33 of FIG. 2, the bearing made up of retainer 28 and ball 29 freely allows whatever movement is imparted to those elements. The connection between beam 10 and tie rod 20a may therefore be said to be a universal connection, as may each of the other tie rod-to-beam connections.

Figure 3:
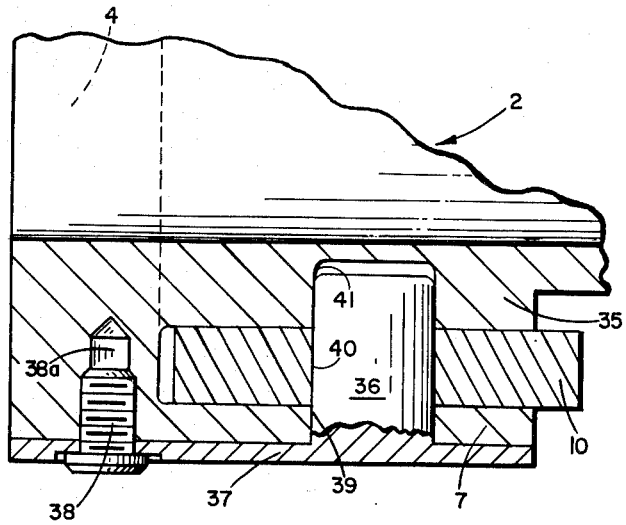
FIG. 3 is a view taken along lines 3—3 of FIG. 1 and enlarged to illustrate pivotal connection of the swinging beam.

The preferred manner of connecting the swinging beams to their end pieces 2 and 3 is illustrated in FIG. 3. Beam 10 is therein pivotally retained between bracket 7 and a boss 35 upon end piece 2 by a pin 36 extending from a plate 37. Plate 37 is retained in an abutting relationship upon bracket 7 by a pin 38 threadedly engaged in a hole 38a within flange 4. Pin 36, preferably integral with plate 37, extends through axially aligned holes 39 in bracket 7 and 40 in beam 10 and into hole 41 in boss 35. Sufficient clearance between bracket 7 and boss 35 is provided to facilitate the free swinging of beam 10 in the illustrated position. Similarly, since pin 36 is stationary, clearance between pin 36 and beam 10 is sufficient to facilitate rotation of the beam about the pin.

Were end pieces 2 and 3 of the FIG. 1 configuration in perfect alignment, and were joint 1 to be viewed from either of its ends, each of the tie rods would form the corner of a square and be at a maximum distance from flexible bellows 6. A maximum deflection of end piece 2 with respect to end piece 3 could, therefore, be allowed without the possibility of interference between bellows 6 and only one of the tie rods. A unit incorporating maximum deflection capabilities is thus achieved.

Figure 4:
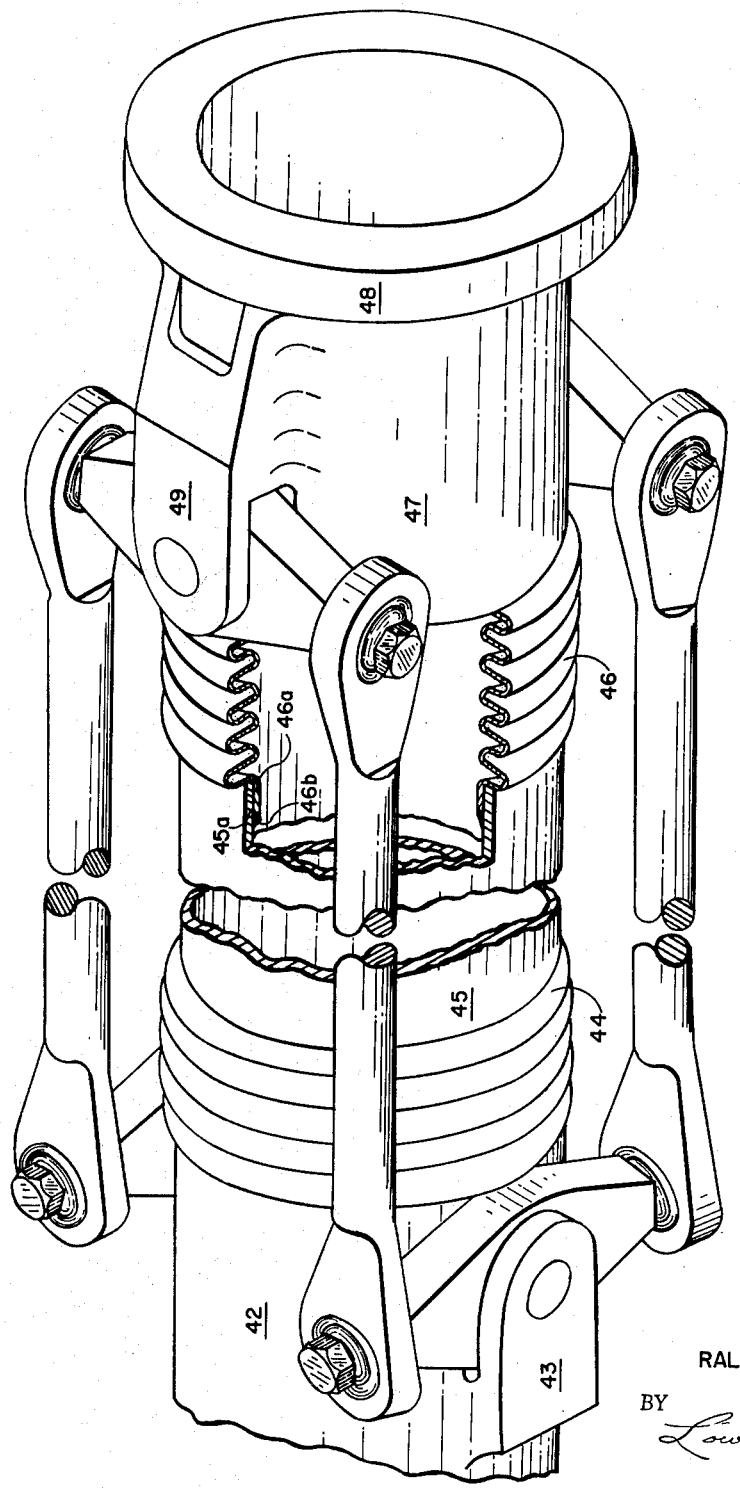
FIG. 4 is a perspective view of the tie means as applied to a pair of flexible bellows separated by a rigid tubular member.

FIG. 4 illustrates a structural variation of the invention, wherein beam and tie rod end piece construction are similar or identical to those of the FIG. 1 universal joint. However, this configuration is illustrative of tie rod adaptability to joints of various lengths and of utilization with a plurality of bellows in the joint proper. Pipe or tube 42 may be the end portion only of a pipe of great length. Brackets 43 are welded or otherwise attached directly to the exterior of pipe 42 and a bellows unit 44 is attached to the pipe end. A rigid tube or conduit 45 is fixed to bellows 44 and a second bellows 46 is fixed to tube 45. An end piece 47, including an attachment flange 48 and a pair of oppositely positioned brackets 49, is attached to the free end of bellows 46.

While bellows-to-tube connections may be accomplished by any conventional attaching method, it has been found that certain applications dictate special precautions, e.g. extreme line cleanliness is required for use with high energy propellants. As shown in FIG. 4, bellows-to-tube connections in such cases are most desirably completed by inserting the bellows free end 46a inside of tubing end 45a and welding the two pieces interiorly at the positions indicated as 46b. This prevents the accumulation of residual fluids or foreign matter within areas which otherwise might be entrapment areas and eliminates the explosive factor often resulting from such accumulations. Exterior welds in this case are optional.

Figure 6:
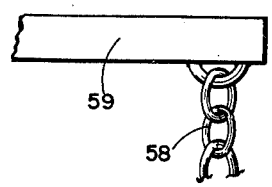
FIG. 6 is a partially cutaway elevation of a chain type tie connected to a swinging beam.
Figure 5:
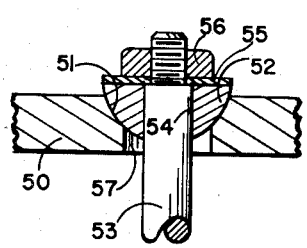
FIG. 5 is a sectional view of an alternate beam-to-tie-rod configuration.

While the tie rod construction set forth above is preferred, it is not always necessary that such tie rods be capable of accepting compression loads. Main tie rod functions are the acceptance of tension loads for the prevention of axial joint separation and the transmittal of forces between swinging beams, facilitating universal joint movements. FIGS. 5 and 6 are representative of alternative swinging beam-to-tie rod attachments wherein tension loads only may be applied.

FIG. 5 shows a swinging beam 50 having a semi-spherical cavity or race 51 formed in one of its sides. A semi-spherical bearing member 52 is positioned to swivel within cavity 51, tension being applied to a tie rod 53 inserted through an attachment hole 54 in bearing 52. The rod-to-bearing position is retained by washer 55 and nut 56. An adequate clearance at the position indicated as 57 must be allowed to facilitate free movement of the tie rod 53.

As illustrated in FIG. 6, a chain 58 may be secured to the end of a swinging beam 59 and extend to a second beam end (not shown) as a tension member in the place of a structurally rigid tie rod. The chain may be welded, bolted, or otherwise secured to the beam.

Figure 7:
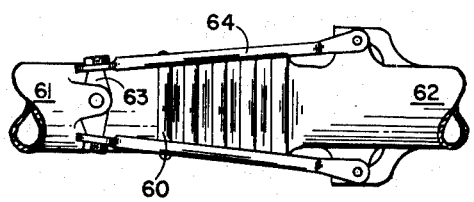
FIG. 7 is a modification of the present invention wherein foreshortened swinging beams are utilized.

The single bellows joint of FIG. 7 shows a bellows 60 as it may be adapted between a pair of pipe ends 61 and 62 without intermediate flanges. This figure is particularly illustrative of the foreshortening of the swinging beam members. Beam 63, representative of each of the four swinging beams upon the assembly is only of sufficient length to provide tie rods 64 interconnecting the beams and bellows 60 with the clearance necessary for the amount of flexing required in the particular application to which the unit is adapted. The swinging beams in this instance may actually be shorter in length than the diametric dimension of the bellows. Therefore, the tie rods do not lie in the plane of the joint axis, as do the tie rods heretofore described, but are positioned at an oblique or compound angle with respect thereto. Functionally, the FIG. 7 structure accomplishes its purpose in the same manner as does the structure of FIG. 1 and FIG. 2, but since it is more compact than those units, less space is necessitated for its application.

Figure 8:
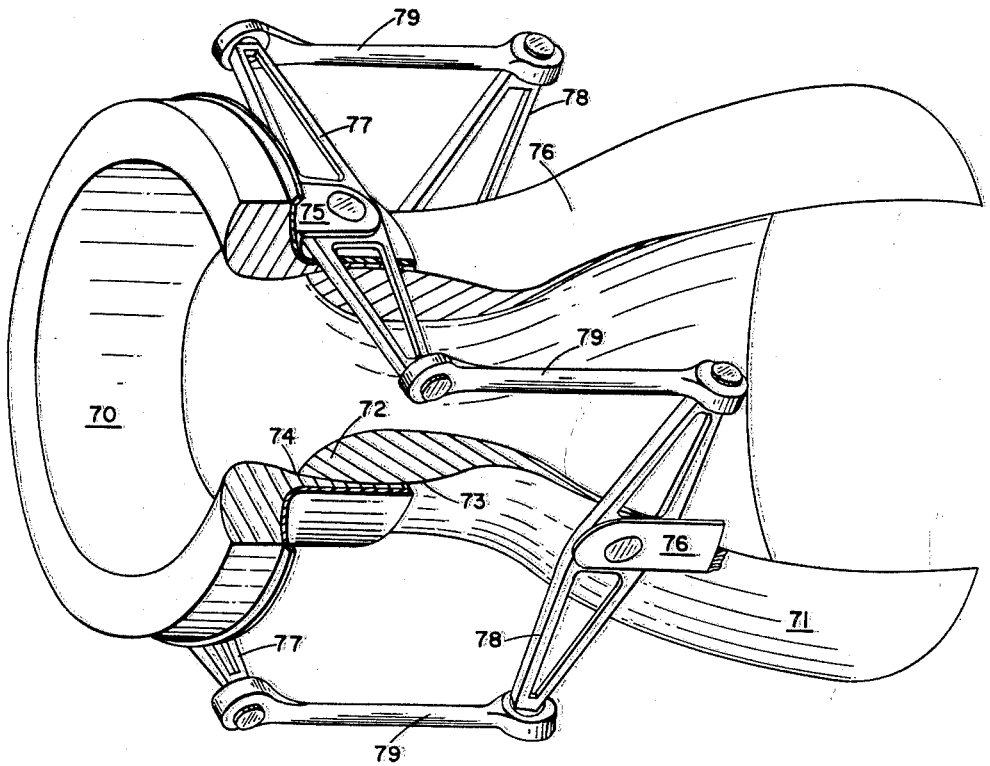
FIG. 8 is a perspective cutaway view of the tie mechanism adapted to a rocket engine thrust chamber as a universal gimbal restraint.

In FIG. 8, the basic restraining mechanism of the present invention is adapted to a rocket engine nozzle gimballing device. A combustion chamber 70 and a nozzle 71 are shown representatively only to illustrate the principle involved. A throat, including portion 72, has an exterior spherical surface 73 adapted to swivel within an interior spherical surface 74 of chamber 70. A pair of bracket 75 (one only shown) are oppositely positioned upon the exterior of chamber 70 and and a second pair of brackets 76 are oppositely positioned upon the exterior of nozzle 71 approximately 90° removed from brackets 75. Swinging beams 77 and 78 are pivotally mounted upon brackets 75 and 76 respectively and are connected by a series of tie rods 79 in essentially the same manner as heretofore explained with reference to FIGS. 1 and 2. In this instance it is preferable that tie rods 79 be compression members in order that they might accept a portion of the rocket engine thrust load transferred from the nozzle to limit the thrust applied to surface 74 to the combustion chamber through surface 73.

In the functioning of the present nozzle gimbal it is necessary that a conventional actuating means, e.g. a hydraulic cylinder (not shown) be attached to the nozzle and to some other structural point upon the chamber or supporting structure to transmit the force required for the actual gimballing. The purpose of the present restraining mechanism is simply to allow full universal movement of nozzle 51 with respect to combustion chamber 70 while preventing relative axial movement of the combustion chamber and nozzle.

The material from which the components of the present invention are manufactured are limited only by the structural and temperature requirements for particular applications. Common structural metals and other structural materials are generally usable.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A universal restrainer for two relatively movable structural elements comprising a beam means pivotally mounted on each said element, and means interconnecting said beam means on one of said elements with said beam means on the other of said elements so as to restrain relative axial movement of said elements while otherwise allowing relative universal movement thereof, the connection between each said beam means and said interconnecting means being universal.

2. A universal restrainer for two relatively movable structural elements comprising a pair of beams upon each said element, said beams being mounted approximately centrally of their lengths on diametrically opposite sides of said element and pivoted about a common axis, and means interconnecting said beams on one said element with said beams on the other said element so as to restrain axial movement of said elements while otherwise allowing relative universal movement thereof.

3. A universal restrainer as set forth in claim 2, wherein the common axis through each said pair of beams is positioned at approximately 90° from the other said axis and wherein said interconnecting means is a plurality of tie rods, each said tie rod being swivelably connected to an end of one said beam upon each said element.

4. A restrainer for first and second flexibly connected structural end portions, said restrainer comprising a double ended swinging beam pivotally mounted diametrically opposite another said beam upon each end portion, said beams upon each said end portion having a common pivotal axis, said axes being mutually perpendicular, and a separate pair of tie rods universally connected to the ends of each said beam on said first end portion and to one end of each said beam on said second end portion, said tie rods disposed in substantially parallel relation to one another.

5. A restrainer for first and second flexibly connected structural units comprising a pivotally and coaxially mounted pair of double ended swinging beams upon each said unit, said beams upon each said end portion being positioned on diametrically opposite sides thereof, a pivotal axis through said pair of beams on the first unit being approximately normal to a pivotal axis of said pair of beams on the second unit, and a separate one of a plurality of mechanical ties connected to said ends of each said beam on the first unit so as to facilitate free beam-to-tie relative movement and similarly connected to one end of each said beam on the second unit, said tie being disposed in a generally longitudinal direction to said units.

6. The restrainer set forth in claim 5, wherein said ties are rigid rods, each end of said rods including a bearing retainer and a ball-bearing segment retained for universal movement within said retainer, each said bearing segment including a perforation therethrough adapted for attachment to pin means upon said beam ends, and retaining means securing said bearing upon said pin means.

7. The restrainer set forth in claim 5, wherein each said beam includes a semi-spherical cavity in a side adjacent each said end of said beam, and said mechanical ties comprise a series of substantially longitudinal extending tie rods, and wherein a semi-spherical bearing is secured upon each said tie rod and adapted to swivel within said cavity.

8. The restrainer set forth in claim 5, wherein each said tie member is a chain.

9. A universal restrainer and joint comprising first and second end members, a flexible bellows interconnecting said members, a pair of double-ended and centrally pivoted beams mounted about a common axis and upon opposite sides of said first member, a similarly mounted pair of beams upon said second member, the axes of said beams being mutually perpendicular, and four double-ended tie rods, each said tie rod being universally connected at each of its ends to a beam end, said tie rods connected to opposite ends of each of said beams on one said member and being connected to one end of each of said beams on the other of said members.

10. The universal restrainer and joint set forth in claim 9, wherein when said end members are in axial alignment said tie rods are substantially parallel.

11. The universal restrainer and joint set forth in claim 9, wherein said beams are of a length shorter than the diameter of said bellows and wherein said tie rods interconnecting said beams are in an oblique relationship with respect to one another and said joint.

12. The universal restrainer and joint set forth in claim 9, wherein at least two flexible bellows are provided in the flexible joint, and wherein said flexible bellows are axially separated and interconnected by rigid conduit means.

13. A rocket engine gimbal and restraining means comprising a first pair of double-ended beams pivotally mountable about a first axis and upon opposite sides of a combustion chamber, a second pair of similar beams pivotally mountable about a second axis and upon opposite sides of a nozzle positioned and adapted to be swivelled with respect to the combustion chamber, said beam axes being mutually perpendicular, a separate pair of tie rods connected to said ends of each said beam upon the combustion chamber and to one end of each said beam upon the nozzle, whereby the nozzle may be retained against axial separation and allowed to swivel with respect to the combustion chamber.

References Cited in the file of this patent

UNITED STATES PATENTS

| | | |
|---|---|---|
| 1,009,377 | Berry | Nov. 21, 1911 |
| 1,256,871 | Burtt | Feb. 19, 1918 |
| 1,284,984 | Barnes | Nov. 19, 1918 |
| 1,778,658 | Baker | Oct. 14, 1930 |
| 1,802,176 | Knight | Apr. 21, 1931 |
| 2,868,478 | McCloughy | Jan. 13, 1959 |